(12) United States Patent
Otani

(10) Patent No.: US 9,354,503 B2
(45) Date of Patent: May 31, 2016

(54) LASER PROJECTOR

(71) Applicant: SEIKO EPSON CORPORATION, Tokyo (JP)

(72) Inventor: Makoto Otani, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 246 days.

(21) Appl. No.: 14/276,361

(22) Filed: May 13, 2014

(65) Prior Publication Data

US 2014/0347633 A1   Nov. 27, 2014

(30) Foreign Application Priority Data

May 23, 2013 (JP) ................................. 2013-109004

(51) Int. Cl.
| | | |
|---|---|---|
| *G02B 27/48* | (2006.01) | |
| *G03B 21/14* | (2006.01) | |
| *G03B 33/06* | (2006.01) | |
| *G02B 26/12* | (2006.01) | |
| *G03B 21/20* | (2006.01) | |
| *H04N 9/31* | (2006.01) | |
| *G02B 26/10* | (2006.01) | |

(52) U.S. Cl.
CPC ............. *G03B 33/06* (2013.01); *G02B 26/101* (2013.01); *G02B 26/124* (2013.01); *G02B 27/48* (2013.01); *G03B 21/204* (2013.01); *G03B 21/208* (2013.01); *H04N 9/3129* (2013.01)

(58) Field of Classification Search
CPC .... G02B 26/10; G02B 26/101; G02B 26/105; G02B 26/123; G02B 26/124; G02B 27/0031; G02B 27/48; H04N 9/3129; G03B 27/48
See application file for complete search history.

(56) References Cited

U.S. PATENT DOCUMENTS

| | | | |
|---|---|---|---|
| 5,220,452 A | 6/1993 | Anderson | |
| 6,191,802 B1* | 2/2001 | Kessler | B41M 3/06 347/225 |
| 6,323,984 B1* | 11/2001 | Trisnadi | G02B 27/48 348/E9.026 |
| 6,747,781 B2* | 6/2004 | Trisnadi | G02B 27/48 359/279 |
| 7,572,015 B2 | 8/2009 | Kobayashi et al. | |
| 2006/0033009 A1 | 2/2006 | Kobayashi et al. | |
| 2008/0055698 A1* | 3/2008 | Yurlov | G02B 27/48 359/240 |
| 2009/0168134 A1 | 7/2009 | Nojima | |
| 2012/0182529 A1 | 7/2012 | Otani | |

FOREIGN PATENT DOCUMENTS

| | | |
|---|---|---|
| CN | 2901372 Y | 5/2007 |
| JP | A-2005-84117 | 3/2005 |
| JP | A-2006-053495 | 2/2006 |
| JP | A-2007-292993 | 11/2007 |
| JP | A-2009-162825 | 7/2009 |
| JP | A-2010-197930 | 9/2010 |
| JP | A-2011-197211 | 10/2011 |
| JP | A-2012-145765 | 8/2012 |
| JP | A-2012-145804 | 8/2012 |
| JP | A-2012-159823 | 8/2012 |
| JP | A-2012-237814 | 12/2012 |

* cited by examiner

*Primary Examiner* — William C Dowling
(74) *Attorney, Agent, or Firm* — Oliff PLC

(57) ABSTRACT

A laser projector includes a light source, a scanner that two-dimensionally scans a target object with light emitted from the light source, a light collection system that collects light from the scanner with a predetermined collection angle to form an intermediate image, and a projection lens that projects the intermediate image on a projection surface, and the collection angle is greater than a divergence angle of the light emitted from the light source.

6 Claims, 2 Drawing Sheets

LASER PROJECTOR

BACKGROUND

1. Technical Field

The present invention relates to a laser projector.

2. Related Art

There is a known scan-type projector of related art as an image display apparatus capable of displaying a large screen image. A scan-type projector displays an image by raster scanning a screen or any other projection surface with modulated laser light. Laser light, which is single-wavelength light and hence has high degrees of color purity and coherency, is characterized, for example, in that a laser beam is readily shaped. An image display apparatus that displays an image by using laser light can therefore provide significantly increased contrast, color reproducibility, resolution, and other performance factors.

In recent years, there is a known projector that has a light diffusing device disposed therein, forms an image based on modulated laser light as an intermediate image in the light diffusing device, and enlarges and projects the intermediate image through a projection lens (JP-A-2006-53495, for example). The thus configured projector forms a laser projector that is compact and produces a reduced amount of speckle noise.

A laser light source typically used in the laser projector described above, however, has room for improvement from a viewpoint of improvement in image quality from the following reasons.

In a scan-type projector, no physical pixel such as a physical pixel of a liquid crystal device is present, and the laser light spot diameter on the projection surface or in the imaging plane where the intermediate image is formed corresponds to the size of a pixel of a projected image. That is, the smaller the spot diameter on the projection surface or in the plane where the intermediate image is formed, the higher the resolution of a displayed image. On the other hand, reduction in the spot diameter of laser light from a laser light source is limited when high priority is placed on ensuring the output power and reliability of the laser light source.

SUMMARY

An advantage of some aspects of the invention is to provide a laser projector capable of an increase in resolution of a displayed image with output power and reliability of a light source maintained.

A laser projector according to an aspect of the invention includes a light source, a scanner that two-dimensionally scans a target object with light emitted from the light source, a light collection system that collects light from the scanner with a predetermined collection angle to form an intermediate image, and a projection lens that projects the intermediate image on a projection surface, and the collection angle is greater than a divergence angle of the light emitted from the light source.

According to the aspect of the invention, the collection angle with which the light collection system collects light is greater than the divergence angle of the light emitted from the light source, whereby the size of the intermediate image can be smaller than the size of an actual light source image. As a result, the resolution of a displayed image can be increased with the output and reliability of the light source maintained.

It is preferable that the laser projector described above further includes a collimator lens that parallelizes the light emitted from the light source and causes the parallelized light to be incident on the scanner, and the focal length of the light collection system is preferably smaller than the focal length of the collimator lens.

According to this configuration, the focal length of the light collection system, which collects light onto the light diffusing device, is shorter than the focal length of the collimator lens, which parallelizes the light emitted from the light source and causes the parallelized light to be incident on the scanner, whereby the size of a light source image focused in the light diffusing device can be smaller than an actual light source image.

In the laser projector described above, it is preferable that the light source includes a first light source that emits light of a first wavelength and a second light source that emits light of a second wavelength different from the first wavelength.

According to this configuration, the resolution of a displayed image can be improved for each of the light of the first wavelength and the light of the second wavelength, whereby a high-definition color image can be displayed.

In the laser projector described above, it is preferable that the length of the optical path along the light of the first wavelength from the first light source to the position where the intermediate image is formed differs from the length of the optical path along the light of the second wavelength from the second light source to the position where the intermediate image is formed.

According to this configuration, the length of the optical path from the first light source, which emits light of the first wavelength, to the position where the intermediate image is formed differs from the length of the optical path from the second light source, which emits light of the second wavelength, to the position where the intermediate image is formed, whereby the amount of chromatic aberration of magnification, the amount of axial chromatic aberration, and the amounts of other aberrations produced in the light collection system can be reduced.

It is preferable that the laser projector described above further includes a light diffusing device provided in the position where the intermediate image is formed.

According to this configuration, the amount of speckle noise can be reduced.

In the laser projector described above, it is preferable that the light diffusing device is provided to be rotatable around an axis of rotation parallel to the optical axis of the light collection system.

According to this configuration, even in the configuration in which the light diffusing device is provided to be rotatable around an axis of rotation parallel to the optical axis of the light collection system, the size of a light source image focused in the light diffusing device can be smaller than the size of an actual light source image. As a result, the resolution of a displayed image can be increased. Further, since the phase of the light passing through the light diffusing device can be changed with time, the amount of speckle noise can be further reduced.

BRIEF DESCRIPTION OF THE DRAWINGS

The invention will be described with reference to the accompanying drawings, wherein like numbers reference like elements.

DESCRIPTION OF EXEMPLARY EMBODIMENTS

A laser projector according to an embodiment of the invention will be described with reference to FIGS. 1 to 3.

In the present embodiment, a laser projector 100 will be described with reference to a scan-type projector that projects image light produced by a scanning device through a projection system on a screen (projection surface) 80.

Figure 1:
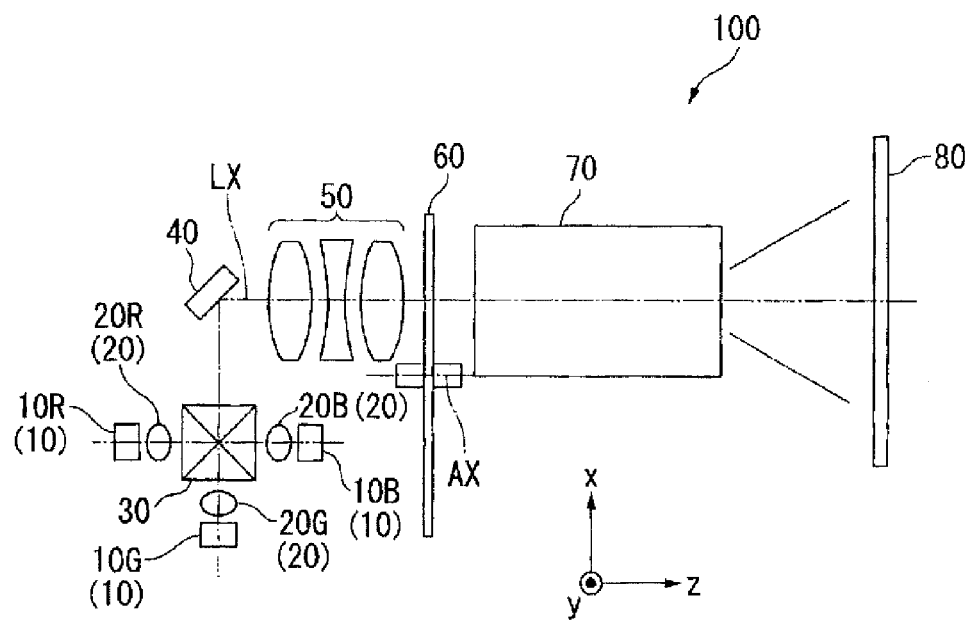
FIG. 1 diagrammatically shows an overall configuration of a laser projector.

FIG. 1 diagrammatically shows an overall configuration of the laser projector 100. The laser projector 100 includes a light source apparatus (light source) 10, a collimator lens unit 20, a dichroic prism 30, a scanning device (scanner) 40, a light collection system 50, a light diffusing device 60, and a projection lens 70, as shown in FIG. 1.

The light source apparatus 10 is formed of a red light source apparatus (first light source) 10R, which emits red light (light of first wavelength), a green light source apparatus (second light source) 10G, which emits green light (light of second wavelength), and a blue light source apparatus (third light source) 10B, which emits blue light (light of third wavelength). The light source apparatus 10 (10R, 10G, 10B) is formed of laser diodes (LDs) capable of emitting laser light.

The collimator lens unit 20 parallelizes the light beams emitted from the light source apparatus 10. The collimator lens unit 20 includes a first collimator lens 20R, which parallelizes the light emitted from the red light source apparatus 10R, a second collimator lens 20G, which parallelizes the light emitted from the green light source apparatus 10G, and a third collimator lens 20B, which parallelizes the light emitted from the blue light source apparatus 10B.

The dichroic prism 30 combines the color light beams parallelized by the first collimator lens 20R, the second collimator lens 20G, and the third collimator lens 20B with one another and outputs the combined light.

The scanning device 40 is a reflective light modulator manufactured based, for example, on a MEMS (micro electro mechanical systems) technology. The scanning device 40 two-dimensionally scans a target object with the red light, the green light, and the blue light having sequentially exited out of the dichroic prism 30 to produce a red image, a green image, and a blue image. The scanning device 40 can, for example, be an MEMS mirror.

The light collection system 50 collects the light beams incident from the scanning device 40 and focuses the light beams in a predetermined plane. The principal ray of each of the light beams passing through the light collection system 50 travels in parallel to the optical axis of the light collection system 50. That is, the light collection system 50 forms a telecentric system.

The light diffusing device 60 is disposed in the position where the light collected by the light collection system 50 is focused. In the light diffusing device 60, red, green, and blue intermediate images are formed. The light diffusing device 60 processes the light having exited out of the light collection system 50 in such a way that the diffusion angle of the light which has exited out of the light diffusing device 60 is greater than the collection angle of the light which enters the light diffusing device 60. The light diffusing device 60 is formed, for example, of a ground glass plate, a diffusing film, or any other diffusing plate, a holographic diffuser or any other diffraction optical element, a microlens array or any other lens assembly. The light diffusing device 60 can be rotated by a drive mechanism (not shown) around a central axis AX, which is parallel to an optical axis LX of the light collection system 50. The provision of the light diffusing device 60 provides a flat light intensity distribution of the light to be projected on the screen 80, whereby the amount of speckle noise is reduced.

The projection lens 70 projects the intermediate images formed in the light diffusing device 60 onto the screen 80. The image plane of the projection lens 70 is conjugate with the plane where the collimator lens unit 20 is disposed and the plane where the light diffusing device 60 is disposed. The projection lens 70 is formed, for example, of a typical projection lens and includes a zooming mechanism and a focusing mechanism as necessary. An image formed by light emitted from each point of each of the intermediate images formed in the light diffusing device 60 is focused by the projection lens 70 on the screen 80.

The laser projector 100 further includes a controller (not shown) that oversees and controls the portions described above and receives image information representing a two-dimensional image from a DVD player, a PC, or any other external apparatus.

The controller produces electric signals based not only on the grayscale of each pixel of the two-dimensional image contained in the image information but also on display timing at which the pixel is displayed, and the produced electric signals are supplied to the red light source apparatus 10R, the green light source apparatus 10G, and the blue light source apparatus 10B, which form the light source apparatus 10. The controller further controls the scanning device 40 in such a way that the pixels displayed by red light Lr, green light Lg, and blue light Lb emitted from the light source apparatus 10 at respective timings correspond to predetermined positions in the two-dimensional image defined by the image information.

Figure 2:
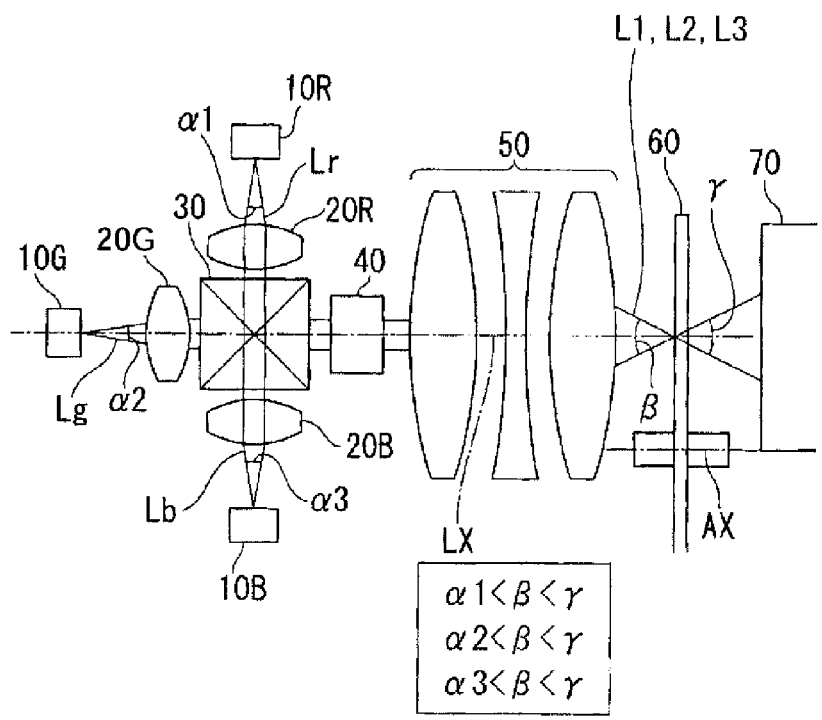
FIG. 2 diagrammatically shows the configuration of part of the laser projector.

FIG. 2 is a diagrammatic view showing an enlarged optical path from the light source apparatus 10 to the light diffusing device 60. In FIG. 2, the scanning device 40 is shown as a light-transmissive device for convenience.

As shown in FIG. 2, the red light Lr emitted from the red light source apparatus 10R has a divergence angle α1 and enters the first collimator lens 20R. The green light Lg emitted from the green light source apparatus 10G has a divergence angle α2 and enters the second collimator lens 20G. The blue light Lb emitted from the blue light source apparatus 10B has a divergence angle α3 and enters the third collimator lens 20B. The divergence angles α1 to α3 may be the same or may differ from each other.

The light collection system 50 receives the red light Lr, the green light Lg, and the blue light Lb incident from the scanning device 40 and collects them with an angle β. In the present embodiment, the collection angle β is greater than each of the divergence angle α1 of the red light Lr, the divergence angle α2 of the green light Lg, and the divergence angle α3 of the blue light Lb. The size of an image formed by each of the red light Lr (L1), the green light Lg (L2), and the blue light Lb (L3) focused in the light diffusing device 60 is therefore smaller than the size of a light source image of each of the red light source apparatus 10R, the green light source apparatus 10G, and the blue light source apparatus 10B.

To achieve a configuration in which the divergence angle α1 of the red light Lr, the divergence angle α2 of the green light Lg, and the divergence angle α3 of the blue light Lb and the collection angle β with which the red light Lr (L1), the green light Lg (L2), and the blue light Lb (L3) are collected satisfy the relationship described above, the focal length of the light collection system 50 only needs to be smaller than the focal length of each of the first collimator lens 20R, the second collimator lens 20G, and the third collimator lens 20B, which form the collimator lens unit 20.

As described above, the collimator lens unit 20 and the light collection system 50, which form a reduction system, form a demagnified image of each of the red light source apparatus 10R, the green light source apparatus 10G, and the blue light source apparatus 10B in the light diffusing device 60. The light incident on the light diffusing device 60 exits therefrom as divergent light having a divergence angle γ which is greater than the collection angle β.

Further, in the present embodiment, to reduce the amount of chromatic aberration of magnification and the amount of axial chromatic aberration produced in the light collection system 50, the length of the optical path of the red light between the red light source apparatus 10R and the light diffusing device 60, the length of the optical path of the green light between the green light source apparatus 10G and the light diffusing device 60, and the length of the optical path of the blue light between the blue light source apparatus 10B and the light diffusing device 60 are so set that they differ from one another. The light collection system 50 therefore does not need to employ what is called an achromatic lens, which corrects chromatic aberrations, and hence the number of lenses can be smaller and glass materials to be used can be selected from a wider variety of types of glass, whereby the degree of freedom in lens design is ensured and the size of the light collection system 50 can be reduced.

Figure 3:
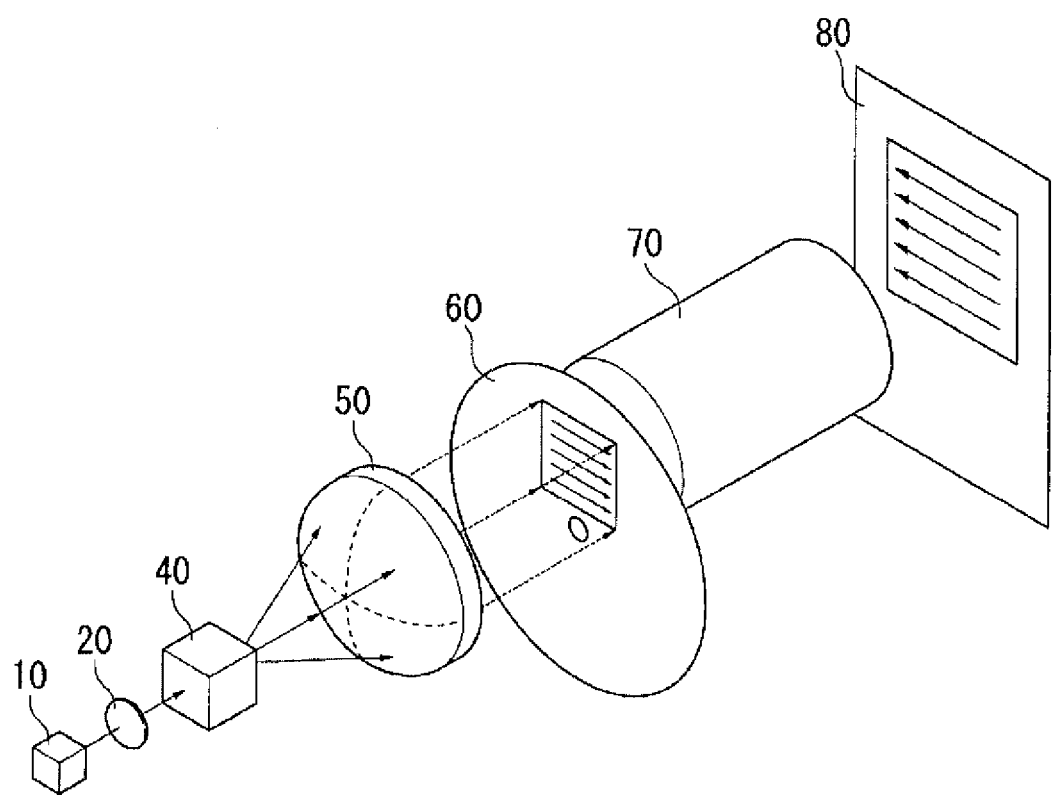
FIG. 3 diagrammatically shows the optical path associated with one of light sources in the laser projector.

FIG. 3 is a diagrammatic view showing an optical system for one of the color components extracted from the laser projector 100. In FIG. 3, the dichroic prism 30 is omitted and the scanning device 40 is shown as a light-transmissive device for convenience.

The light emitted from the light source apparatus 10 passes through the collimator lens unit 20, passes through the dichroic prims 30, and impinges on the scanning device 40, as shown in FIG. 3.

The light from the scanning device 40 enters the light collection system 50. The light having entered the light collection system 50 is collected by the light collection system 50 with the collection angle β, which is a predetermined angle, and forms an intermediate image (two-dimensional image) in the position where the light diffusing device 60 is disposed. The intermediate image formed in the light diffusing device 60 is enlarged and projected by the projection lens 70 on the screen 80.

In the laser projector 100, the size of each pixel projected on the screen 80 corresponds to the spot diameter in the plane where intermediate images formed by the red light Lr, the green light Lg, and the blue light Lb are focused. That is, the smaller the spot diameter in the plane where the intermediate images are focused, the higher the resolution of a displayed image.

According to the present embodiment, the collection angle β with which the light collection system 50 collects light is greater than each of the divergence angle α1 of the red light Lr, the divergence angle α2 of the green light Lg, and the divergence angle α3 of the blue light Lb described above. The size of an image formed by each of the red light Lr, the green light Lg, and the blue light Lb focused in the light diffusing device 60 is therefore smaller than the size of a light source image of each of the red light source apparatus 10R, the green light source apparatus 10G, and the blue light source apparatus 10B. As described above, in the laser projector 100 according to the present embodiment, the spot diameters in the plane where the intermediate images are focused can be reduced without any change in the spot diameter of the light from each of the red light source apparatus 10R, the green light source apparatus 10G, and the blue light source apparatus 10B themselves, whereby the resolution of a displayed image can be increased with the output and reliability of the light source apparatus 10 maintained.

In the present embodiment, the light diffusing device 60 is provided to be rotatable around the central axis AX parallel to the optical axis LX of the light collection system 50, but the light diffusing device 60 is not necessarily configured this way. The light diffusing device is not necessarily rotatable.

The entire disclosure of Japanese Patent Application No. 2013-109004, filed on May 23, 2013 is expressly incorporated by reference herein.

What is claimed is:

1. A laser projector comprising:
a light source;
a scanner that two-dimensionally scans a target object with light emitted from the light source;
a light collection system that collects light from the scanner with a predetermined collection angle to form an intermediate image; and
a projection lens that projects the intermediate image on a projection surface,
wherein the collection angle is greater than a divergence angle of the light emitted from the light source.

2. The laser projector according to claim 1,
further comprising a collimator lens that parallelizes the light emitted from the light source and causes the parallelized light to be incident on the scanner,
wherein the focal length of the light collection system is smaller than the focal length of the collimator lens.

3. The laser projector according to claim 1,
wherein the light source includes
a first light source that emits light of a first wavelength, and
a second light source that emits light of a second wavelength different from the first wavelength.

4. The laser projector according to claim 3,
wherein the length of the optical path along the light of the first wavelength from the first light source to the position where the intermediate image is formed differs from the length of the optical path along the light of the second wavelength from the second light source to the position where the intermediate image is formed.

5. The laser projector according to claim 1,
further comprising a light diffusing device provided in the position where the intermediate image is formed.

6. The laser projector according to claim 5,
wherein the light diffusing device is provided to be rotatable around an axis of rotation parallel to the optical axis of the light collection system.

* * * * *